US008653222B2

(12) United States Patent
Orth et al.

(10) Patent No.: US 8,653,222 B2
(45) Date of Patent: Feb. 18, 2014

(54) UNIVERSAL WETTING AGENTS AND DISPERSANTS BASED ON ISOCYANATE MONOADDUCTS

(75) Inventors: Ulrich Orth, Wesel (DE); Jürgen Omeis, Dorsten-Lembeck (DE); Heribert Holtkamp, Wesel (DE); Matthias Pickavé, Mulheim an der Ruhr (DE)

(73) Assignee: BYK-Chemie GmbH (DE)

( * ) Notice: Subject to any disclaimer, the term of this patent is extended or adjusted under 35 U.S.C. 154(b) by 645 days.

(21) Appl. No.: 12/224,523

(22) PCT Filed: Jan. 31, 2008

(86) PCT No.: PCT/EP2008/000765
§ 371 (c)(1),
(2), (4) Date: Jan. 28, 2009

(87) PCT Pub. No.: WO2008/092687
PCT Pub. Date: Aug. 7, 2008

(65) Prior Publication Data
US 2009/0221745 A1 Sep. 3, 2009

(30) Foreign Application Priority Data
Jan. 31, 2007 (DE) .......................... 10 2007 005 720

(51) Int. Cl.
*C08G 18/00* (2006.01)
(52) U.S. Cl.
USPC ............. 528/85; 528/59; 528/61; 528/64; 528/68; 528/69
(58) Field of Classification Search
USPC .............. 528/59, 61, 68, 64, 69, 85, 62
See application file for complete search history.

(56) References Cited

U.S. PATENT DOCUMENTS

| | | | |
|---|---|---|---|
| 4,007,154 A * | 2/1977 | Schimmel et al. | 523/435 |
| 4,134,865 A * | 1/1979 | Tominaga | 523/415 |
| 4,710,561 A | 12/1987 | Tominaga et al. | |
| 4,795,796 A * | 1/1989 | Haubennestel et al. | 528/28 |
| 4,942,213 A | 7/1990 | Haubennestel et al. | |
| 5,128,393 A | 7/1992 | Peng et al. | |
| 5,378,762 A * | 1/1995 | Czornij et al. | 525/187 |
| 5,908,902 A | 6/1999 | Pfeil et al. | |
| 6,420,466 B1 * | 7/2002 | Haubennestel et al. | 524/195 |
| 6,617,468 B2 * | 9/2003 | Haubennestel et al. | 560/25 |
| 7,312,260 B2 | 12/2007 | Krappe et al. | |
| 2005/0250927 A1* | 11/2005 | Pritschins et al. | 528/44 |
| 2005/0279254 A1* | 12/2005 | Toi et al. | 106/287.3 |
| 2006/0089426 A1* | 4/2006 | Haubennestel et al. | 523/404 |

FOREIGN PATENT DOCUMENTS

| | | |
|---|---|---|
| DE | 3623296 | 1/1988 |
| DE | 3623297 | 1/1988 |
| DE | 10326147 | 3/2005 |
| EP | 0270126 A2 | 6/1988 |
| EP | 0318999 A2 | 6/1988 |
| EP | 0747413 A2 | 12/1996 |
| EP | 1650246 A1 | 4/2006 |
| WO | WO-2005/113677 A1 | 12/2005 |

OTHER PUBLICATIONS

Dow Chemical Company. Carbowax PEGs and MPEGs for Industrial Applications. http://www.dow.com/polyglycols/carbowax/products/mpeg.htm 1995-2011.*
"International Application Ser. No. PCT/EP2008/000765, Translation of the International Preliminary Report on Patentability", (Oct. 15, 2009), 8 pgs.
"International Application Serial No. PCT/EP2008/000765, International Search Report mailed May 8, 2008" (w/ English Translation), 4pgs.

* cited by examiner

*Primary Examiner* — Michael L Leonard
(74) *Attorney, Agent, or Firm* — Schwegman, Lundberg & Woessner, P.A.

(57) ABSTRACT

Reaction products of polyepoxides with amines followed by reaction with polyalkyleneoxide modified and/or polyester-modified and/or polyether-polyester-modified isocyanates give comblike aminic polymers, and their salts. The compounds are useful as wetting and dispersing agents for organic and inorganic pigments, and as fillers for aqueous and solvent-borne systems.

22 Claims, No Drawings

UNIVERSAL WETTING AGENTS AND DISPERSANTS BASED ON ISOCYANATE MONOADDUCTS

RELATED APPLICATIONS

This application is a U.S. National Stage filing under 35 U.S.C. §371 from International Application No. PCT/EP2008/000765, filed Jan. 31, 2008, and published in German as WO 2008/092687 A1, which claims priority from German Application No. 10 2007 005 720.4, filed Jan. 31, 2007, which applications and publication are incorporated herein by reference and made a part hereof.

The invention relates to reaction products of epoxides with amines and polyalkyleneoxide modified and/or polyester-modified and/or polyether-polyester-modified isocyanates to give aminic polymers, and also their salts, as wetting and dispersing agents for pigments and fillers, and also to a process for preparing them. The resultant polymers are comblike. The invention further relates to the use of these reaction products as wetting and dispersing agents for organic and inorganic pigments, and also fillers, in aqueous and solvent-borne systems.

The aforementioned reaction products are suitable more particularly for preparing pigment concentrates and also for stabilizing solids in binders, coating materials, plastics and polymeric mixtures. As wetting and dispersing agents they reduce the viscosity of such systems, improve the storage stability and the flow properties, and may enhance the colour strength.

High mechanical forces are necessary in order to introduce solids stably into liquid media. As a consequence of this it is usual to use agents in order to lower these dispersing forces and hence to minimize not only the total energy input required into the system but also the dispersing time. The known dispersing agents (dispersants) are generally surface-active substances which in a small amount are either applied directly to the solid or added to the liquid medium. Even after complete deflocculation of the agglomerates of solids, instances of reagglomeration may occur after the dispersing operation, thereby wholly or partly negating the dispersing effort. In this way, unwanted effects may come about, such as an increase in viscosity in the liquid systems, shade drift, or a loss of gloss in paints and coatings.

A multiplicity of different substances are known for present-day use as dispersants for pigment and fillers. One review of existing patent literature is found in EP 0 318 999 A. As well as simple compounds of low molecular weight such as lecithin, fatty acids and their salts, and alkylphenol ethoxylates, use is also made, by way of example, of complex structures as wetting and dispersing agents.

One known group of such dispersants is based on reaction products of monoepoxides or polyepoxides with amines which contain an imidazoline moiety. A review of this group of dispersants is found in publications including the U.S. patents U.S. Pat. Nos. 5,128,393 and 4,710,561. Another group of dispersants is formed from polyepoxide/amine mixtures and their salts. The publications DE 36 23 296 A and DE 36 23 297 A disclose the use of such mixtures as dispersants for pigments primarily in organic media, the polyepoxides being novolaks and the amines used being aliphatic, aromatic and/or heterocyclic amines of low molecular weight.

Recently there have been further developments in the field of the polyepoxide/amine dispersants. EP 747 413 A describes, as emulsifiers, reaction products of aliphatic polyols with epoxides having at least two epoxide groups per ring. These compounds, accordingly, do not carry any nitrogen atoms from which salts can be formed, and therefore exhibit only low affinity for fillers and pigments. DE 103 26 147 A1, in contrast, describes addition compounds, suitable as wetting and dispersing agents, of monofunctional or polyfunctional aromatic epoxides with polyoxyalkylenemonoamines. These specific amines contain at least four ether oxygens per molecule. A further application of the specific polyether-substituted amines is disclosed in WO 2005/113677 A1. There the amines serve as emulsifiers for producing a wide spectrum of paints with a high pigment fraction.

Features common to all of the aforementioned dispersants are that they were in each case developed for a narrowly restricted field of use and therefore are geared specifically to the pigment/binder mixture. In systems with sharp differences in polarity, however, their usefulness is limited.

A further disadvantage of the dispersants that are based on polyether-substituted amines lies in the limited availability of the amines. At the present time, for example, only about five different amines are available. Polyether-polyester-modified primary amines, in contrast, are not available at all.

Specifically in the context of industrial applications the narrow spectrum and poor availability of the existing wetting and dispersing agents represents a barrier, since in the train of the rationalized operational sequences it is preferred to use modular components. In the sense of a building-block system, these modular components ought to be readily compatible with the other components such as binders, auxiliaries and solvents.

It is an object of the present invention, therefore, to provide a wetting and dispersing agent that is highly compatible with commonplace binder and solvent systems. At the same time the wetting and dispersing agent is to be readily available and to have good long-term stability and storage stability. An accompanying aim is to specify a process for preparing such wetting and dispersing agents.

This object is achieved in accordance with the invention by means of an addition compound suitable as a wetting and dispersing agent and obtainable from the reaction of
A) polyepoxides with
B) at least one aliphatic and/or araliphatic primary amine of the general formula I $$H_2N-R \qquad \qquad I$$

where R is alkyl, cycloalkyl, aryl or aralkyl, and where the primary amine may also carry further functional groups selected from —OH, tertiary amine or carboxyl, and subsequent addition reaction of
C) at least one modified isocyanate of the general formula IIa and/or IIb

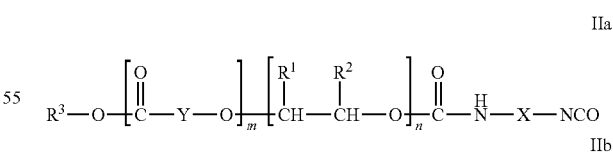

where $R^3$ is alkyl, cycloalkyl, aryl or aralkyl, $R^1$ and $R^2$ independently of one another are H, alkyl and/or aryl, X is alkylene, cycloalkylene and/or aralkylene, Y is alkylene and/or cycloalkylene and n and m are independent of one another, the sum n+m being ≥2, to form a urethane.

As a result of the use of the polyether-, polyester- and/or polyether-polyester-modified isocyanates the addition compounds of the invention have a broad availability. The urethane bond additionally present in the compounds of the invention allows not only a broad compatibility with commonplace binder/solvent systems but also an advantageous long-term stability and storage stability, on the basis of their chemical inertness.

As component A it is possible to use aromatic-containing and/or aliphatic polyepoxides. The polyepoxides can contain two or more epoxy groups per molecule, and have at least six carbon atoms. Mixtures of different polyepoxides can also be used. Typical examples from the group of the aromatic-containing polyepoxides are reaction products of diphenylolpropane (bisphenol A) with epichlorohydrin and the higher homologues thereof that are available, for example, under the brand names D.E.R. or Epikote from the DOW Chemical Company or from Resolution Performance Products, respectively. Examples of aliphatic polyepoxides are 1,6-hexane diglycidyl ether and 1,4-butane diglycidyl ether. The aliphatic polyepoxides may also additionally contain oxygen in the chain, such as polypropylene glycol diglycidyl ether and polytetrahydrofuran diglycidyl ether, for example. These aliphatic polyepoxides are available, for example, under the trade name Grilonit® from Ems-Chemie.

The aliphatic and/or aralphatic amines of component B preferably have 3 to 28 carbon atoms. As additional functional groups particular preference is given to hydroxyl groups or to tertiary amino groups. Suitable amines having an additional functional group are, for example ethanolamine, butanolamine, 2-amino-2-methyl-1-propanol. Suitable amines having more than one additional functional group are, for example, 2-amino-2-ethyl-1,3-propanediol or 2-amino-2-hydroxymethyl-1,3-propanediol. More particular preference is possessed, for example, by ethanolamine, butanolamine and/or dimethylaminopropylamine. In accordance with the invention the amines of component B preferably have no alkoxy functions as additional functional groups.

The modified isocyanates C are preferably polyalkyleneoxide modified isocyanates of the formula IIc

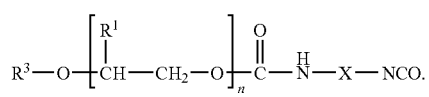

where $R^3$ is alkyl, cycloalkyl, aryl or aralkyl, $R^1$ is H, methyl and/or ethyl, X is alkylene, cycloalkylene and/or aralkylene and n is 1 to 100. Particular preference is given to polyalkyleneoxide modified isocyanates IIc with n=2 to 100.

In one preferred embodiment of the present invention at least one further primary amine D is used of the general formula III

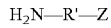

where R' is alkylene and Z is a heterocyclic radical. The amines of component D are preferably heterocyclic compounds having 5- or 6-membered rings, containing as heteroatoms preferably N and/or O, such as, for example, N-(3-aminopropyl)imidazole or N-(2-amino-ethyl)morpholine.

In accordance with the invention the components A and B or A, B and D can be reacted with one another in a stoichiometric excess of component A to form epoxide-terminated polymers.

It is equally possible in accordance with the invention to react components A and B or A, B and D with one another in a stoichiometric excess of components B and/or D to form amine-terminated polymers.

In a further preferred embodiment of the present invention component C is used in an amount such that 5-100%, preferably 20-100% and with particular preference 40-100% of the OH groups generated by the addition reaction of components A, B and D are reacted with formation of urethane.

In one preferred embodiment of the present invention component A is diepoxides of the general formula IV

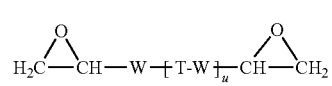

with W=—$CH_2$—O— or —$CH_2$—, T=alkyl, cycloalkyl, aryl or aralkyl, and u=1-8.

Particular preference is given to the use as component A of aromatic-containing diepoxide compounds having on average two epoxy functions per molecule, and with particular preference diglycidyl ethers of difunctional phenols. The aromatic-containing diepoxide compounds have the advantage that they exhibit a higher binder compatibility.

Particular preference is given to using, as component A, aliphatic or cycloaliphatic diepoxide compounds having on average two epoxy functions per molecule, and with particular preference diepoxide compounds containing diglycidyl ether. As a result of the lower inherent viscosity of these aliphatic and cycloaliphatic diepoxide compounds as compared with the aromatic-containing compounds, and the associated lower viscosity of the polymer formed, structures of higher molecular mass are possible.

The addition compounds obtained from components A, B and C or A, B, C and D constitute high-value wetting and dispersing agents of broad compatibility. They can be used in the form in which they are obtained as a result of the two-stage reaction. In order to adapt their properties in each individual case to specific requirements, however, it is in some cases desirable to subject them to further modification. Described below are suitable modifications based on a reaction with the hydroxyl and/or amino groups present in the addition compounds. In the course of the modification some or all of these groups may be reacted.

The following modification reactions can be combined as and when required, thereby giving multiply modified addition compounds. Where two or more modification reactions are to be carried out in succession, it should be ensured that a sufficient number of reactive groups for one or more subsequent reactions be maintained in the molecule. The stated modifications are advantageous embodiments of the present invention and can be realized by:

1. reacting the terminal amino groups with isocyanates, lactones, cyclic carbonates or acrylates,
2. reacting the terminal epoxide group with secondary amines or acids,
3. reacting the remaining hydroxyl function with hydroxycarboxylic acids and/or cyclic lactones,
4. reacting the remaining hydroxyl function with isocyanates other than those listed under C,
5. reacting the remaining hydroxyl function with phosphoric acid or polyphosphoric acid and/or acidic phosphoric esters and/or carboxylic acids, and
6. alkylating or oxidizing the amino group to form quaternary ammonium salts or nitrogen oxides.

The free hydroxyl groups remaining, where appropriate, in the addition compounds of the invention can be esterified as indicated under 3. The esterification takes place in a way which is known to a person skilled in the art. If there are also free amino groups present in the addition product of the invention, it is advisable to form salts of these amino groups prior to the esterification, in order to obtain a satisfactory reaction rate. In the transesterification, terminal OH groups are retained, thereby making the resultant products outstandingly suited through particularly broad compatibility in numerous paint systems.

The compounds formed in the addition reaction of the invention, with hydroxyl groups remaining if appropriate, may also be reacted with isocyanates as per 4. The urethane formation is carried out in a way which is known to a person skilled in the art. The transformation of the hydroxyl group into a urethane group is preferably performed if hydroxyl groups are disruptive in the paint system. Furthermore, the further urethane formation may be beneficial to the defoaming action of the wetting and dispersing agents. Particularly in cases of grinding in aqueous formulations, suppressing the foam tendency constitutes an important additional property of the wetting and dispersing agents.

The modification described under 6. of the amino groups remaining where appropriate takes place in a way which is known to a person skilled in the art. Quaternization of the amino nitrogen atom, for example, may be achieved using alkyl or aralkyl halides, using halocarboxylic esters or using epoxides. Quaternization of this kind is preferred, for example, when amino groups are disruptive in the binder system into which the pigment paste is incorporated.

The reaction of the epoxide function of component A with the amino groups of components B or B and C to form the β-hydroxyamino function may be carried out in a solvent system, but preferably in bulk, in accordance with the methods that are known to a person skilled in the art. The reaction temperature to be chosen depends on the reactivity of the reactants. Many epoxides react with amines even at room temperature. For less reactive epoxides, in contrast, reaction temperatures of up to 160° C. may be needed. Particularly suitable reaction temperatures for the reaction of epoxides with amines are situated at 50-120° C. Where appropriate, catalysts known to a person skilled in the art can be used in order to accelerate the reaction of the epoxide with the amine.

Component C is preferably prepared by the methods as described in DE 199 19 482 A1. For that purpose, monohydroxy compounds are reacted with an excess of diisocyanate, preferably tolylene diisocyanate, and the unreacted portion of the diisocyanate is removed from the reaction mixture.

The object of the present invention is likewise achieved by a process for preparing an addition compound suitable as a wetting and dispersing agent, by reaction of A) polyepoxides with B) at least one aliphatic and/or araliphatic primary amine of the general formula I $$H_2N—R \qquad\qquad I$$

where R is alkyl, cycloalkyl, aryl and aralkyl, and where the primary amine may also carry further functional groups selected from —OH, tertiary amine or carboxyl, and subsequent addition reaction of C) at least one modified isocyanate of the general formula IIa and/or IIb

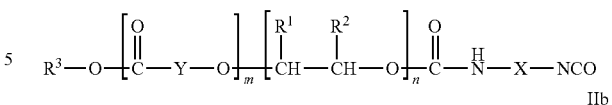

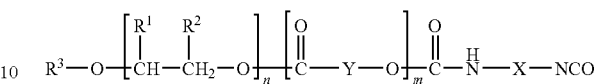

where $R^3$ is alkyl, cycloalkyl, aryl or aralkyl, $R^1$ and $R^2$ independently of one another are H, alkyl and/or aryl, X is alkylene, cycloalkylene and/or aralkylene, Y is alkylene and/or cycloalkylene and n and m are independent of one another, the sum n+m being ≥2, to form a urethane.

One preferred embodiment of the process of the invention uses polyalkyleneoxide modified isocyanates of the formula IIc

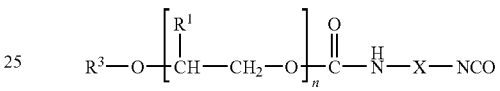

as isocyanates C, where $R^3$ is alkyl, cycloalkyl, aryl and/or aralkyl, $R^1$ is H, methyl and/or ethyl, X is alkylene, cycloalkylene and/or aralkylene and n is 1 to 100.

A further preferred embodiment of the process of the invention uses a further primary amine D of the general formula III $$H_2N—R'—Z \qquad\qquad III$$

where R' is alkylene and Z is a heterocyclic radical.

In one preferred embodiment of the process of the invention use is made as component A) of diepoxides of the general formula IV

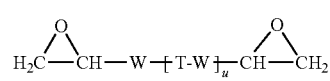

with W=—$CH_2$—O— or —$CH_2$—, T=alkyl, cycloalkyl, aryl or aralkyl, and u=1-8.

In a further embodiment of the process of the invention components A and B or A and B+D can be used preferably in a molar ratio of 2:3 to 3:2.

With a view to the use of component C, the amount of this component that is used is preferably selected such that, in the addition reaction, 5-100%, preferably 20-100% and with particular preference 40-100% of the OH groups generated by the addition reaction of components A and B or A, B and D are reacted with formation of urethane.

In this way a particularly high compatibility of the addition compound with binders specifically in aqueous systems is achieved.

The addition compounds of the invention are used as wetting and/or dispersing agents for organic and/or inorganic pigments or fillers. The dispersants can be used alone or together with binders. With particular preference the wetting and dispersing agents of the invention find their application in aqueous and/or solvent-borne paints, for the stabilization and dispersion of pigments and fillers.

Besides their use as wetting and dispersing agents in aqueous and/or solvent-borne dispersions, more particularly paints, it is likewise possible to use the addition compounds of the invention to coat solids in powder or fibre form. Coating operations of this kind on organic and inorganic solids are carried out in a known way; for example, such methods are described in EP 0 270 126 A. Specifically in the case of pigments, coating of the pigment surface may take place during or after the pigment synthesis, by addition, for example, of the addition compounds of the invention to the pigment suspension. Pigments pretreated in this way exhibit ease of incorporation into the binder system, improved viscosity and flocculation behaviour, and good gloss as compared with untreated pigments. The addition compounds of the invention are suitable, furthermore, for the dispersing of, for example, effect pigments in nail varnishes.

The dispersants of the invention are used preferably in an amount of 0.5-60% by weight, based on the solid to be dispersed. For specific solids, however, substantially higher amounts of dispersant may be necessary for the dispersing operation.

The amount of dispersant employed is substantially dependent on the size and nature of the surface of the solid that is to be dispersed. Carbon black, for example, requires substantially larger amounts of dispersant than does titanium dioxide. EP 0 270 126 A contains examples of pigments and fillers. Further examples are based on new developments, particularly in the field of organic pigments, such as in the class of the diketopyrrolopyrroles. Magnetic pigments as well, based on pure iron or mixed oxides, can be incorporated into dispersions with the aid of the dispersants of the invention. Furthermore, mineral fillers too, such as calcium carbonate and calcium oxide, or flame retardants such as aluminium hydroxide or magnesium hydroxide can be dispersed. Moreover, matting agents such as silicas are also dispersed and stabilized.

The invention is further elucidated by the examples below, without being restricted by them. Unless indicated otherwise, any reference to parts is to parts by weight, and any reference to percentages to percentages by weight.

EXAMPLES

Example 1

A 250 ml four-necked flask with KPG stirrer, nitrogen line and intensive condenser was charged with 13.0 g of Epikote 828 in 16 g of ethyl acetate. The clear solution was heated to 75° C. with stirring. Over the course of 3 minutes 2.73 g of ethanolamine were added dropwise. The initially clear solution became hazy after 3 hours. After a reaction time totaling 5 hours, 34.8 g of TDI-M 350 monoadduct were added dropwise. After a further 3 hours of reaction time at 80° C. the reaction product was diluted with 75.75 g of DI water. The ethyl acetate was removed over the course of 2 hours on a rotary evaporator at 200 mbar and 60° C. The product prepared is a clear, yellowish solution with 40% solids.

The further examples were carried out in accordance with the instructions given above, using the reactants shown in the table below.

| Example | Epoxides [molar ratio] | Amine [molar ratio] | Molar ratio [epoxide: amine] | Isocyanate adduct | OH groups reacted |
|---|---|---|---|---|---|
| 2 | Grilonit RV 1812 | Benzylamine | 9:10 | TDI-M2000 | 50% |
| 3 | Epikote 828/ Grilonit RV 1806 [1:1] | Ethanolamine | 2:3 | TDI-M 350 | 50% |
| 4 | Grilonit RV 1812 | Benzylamine | 3:4 | TDI-M2000 | 50% |
| 5 | Grilonit RV 1812 | Benzylamine | 6:7 | TDI-M2000 | 50% |
| 6 | Epikote 828 | Ethanolamine | 7:8 | TDI-M750 | 50% |

TDI: Tolylene diisocyanate (isomer mixture)
M350: Methoxypolyethylene glycol (molecular weight 350)
M750: Methoxypolyethylene glycol (molecular weight 750)
M2000: Methoxypolyethylene glycol (molecular weight 2000)
Grilonit RV 1806: 1,4-Butane diglycidyl ether
Grilonit RV 1812: 1,6-Hexane diglycidyl ether
Epikote 828: Bisphenol A diglycidyl ether Employed as a comparative example (not inventive) was Example 1 of WO 2005/113677 of Huntsman.

Application Tests

To test the activity of the dispersants of the invention, binder-free pigment pastes were prepared and were incorporated into a binder. Assessments were made of the foam behaviour and the viscosity. Following application and curing of the completed pigment paints, the drawdowns were then assessed visually, and measurements were performed for transparency, colour strength, gloss and haze.

The components of the formulation were dispersed over 40 minutes at 40° C. and 10 000 rpm with the aid of a Dispermat CV from VMA-Getzmann GmbH.

Formulation:
 Water: 30.16 g
 Byk 034: 0.40 g
 Irgalithrot FBN: 36.00 g
 Wetting and dispersing agent: 13.50 g
 Joncryl 8052 binder: 186.67 g Byk 034: Defoamer from Byk-Chemie GmbH
Irgalithrot FBN: Red Naphthol AS pigments from Ciba
Joncryl 8052: Acrylate dispersion from Johnson Polymers Assessment

| Example | Foam | Transparency | Gloss 20° | Gloss 60° | Colour strength | Viscosity |
|---|---|---|---|---|---|---|
| 1 | little foam | 1 | 56 | 87 | 2 | 1 |
| 2 | little foam | 1 | 55 | 86 | 1-2 | 1 |
| 3 | little foam | 1 | 57 | 87 | 1-2 | 2 |
| 4 | little foam | 1 | 55 | 85 | 1-2 | 2 |
| 5 | little foam | 1 | 57 | 86 | 1-2 | 2 |
| 6 | little foam | 1-2 | 45 | 81 | 1-2 | 1 |
| Compar. example | foamy | 2-3 | 41 | 80 | 4 | 2 |

Example 7

A 250 ml four-necked flask with KPG stirrer, nitrogen line and intensive condenser was charged with 13.07 g of Grilonit F713 in 69.3 g of methoxypropyl acetate. The clear solution was heated to 75° C. with stirring. Over the course of 3 minutes 1.93 g of benzylamine were added dropwise [molar ratio 15:16]. After a reaction time totaling 5 hours, 54.3 g of a TDI monoadduct of a caprolactone polyester prepared starting from decanol (C16CAPA) were added dropwise. The product prepared is a clear, yellowish solution with 50% solids.

The further examples were carried out in accordance with the instructions given above of Example 7, using the reactants shown in the table below.

| Example | Epoxide(s) | Amine B | Amine D | Molar ratio [amine B: amine D] | Molar ratio [epoxide: amines] | Isocyanate adduct |
|---|---|---|---|---|---|---|
| 8 | Grilonit F704 | Benzylamine | Aminopropylimidazole | 6:1 | 15:16 | TDI-M1500 |
| 9 | Grilonit F713 | Benzylamine | Aminopropylimidazole | 8:1 | 15:16 | TDI-M1500 |
| 10 | Grilonit RV 1812 | Benzylamine | Aminopropylimidazole | 6:1 | 15:16 | TDI-M2000 |
| 11 | Grilonit F704 | Benzylamine | Aminopropylimidazole | 4:1 | 15:16 | TDI-C16CAPA |
| 12 | Grilonit F713 | Benzylamine | Aminopropylimidazole | 4:1 | 15:16 | TDI-C16CAPA |

TDI: Tolylene diisocyanate (isomer mixture)
M1500: Methoxypolyethylene glycol (molecular weight 1500]
Grilonit F713: Polytetrahydrofuran diglycidyl ether (9-THF units)
Grilonit F704: Polypropylene glycol diglycidyl ether (7 PO units)
C16CAPA: Caprolactone polyester prepared starting from decanol; C16:CAPA=1:5

Employed as a comparative example 2 (not inventive) was Example 4 of DE 10326147.

Application Tests

To test the activity of the dispersants of the invention, pigment pastes (millbase) were first prepared and were then incorporated into a binder (letdown). Assessments were made of the foam behaviour and the viscosity. Following application and curing of the completed pigment paints, the drawdowns were then assessed visually, and measurements were performed for transparency, gloss and haze.

The components of the formulation were dispersed over 40 minutes at 40° C. and 10 000 rpm with the aid of a Dispermat CV from VMA-Getzmann GmbH.

Formulation
Millbase
  Macrynal SM 516 21.4 g
  Methoxypropyl acetate 14 g
  Heliogenblau 6975 F 7.5 g
  Wetting and dispersing agent 6.5 g
  Butyl acetate 0.6 g
Letdown
  Millbase 50 g
  Methoxypropyl acetate 10 g
  Macrynal SM 516 34.96 g
  Butyl glycol acetate 0.5 g
  Butyl acetate 3.49 g
  DBTL (1% in butyl acetate) 0.9 g
  Byk 331 0.15 g Byk 331: Flow control additive from Byk-Chemie GmbH
Heliogenblau 6975 F: Blue phthalocyanine pigment from BASF
Macrynal SM 516: Polyacrylate, 70% strength in butyl acetate, from Clariant Assessment

| Example | Viscosity | Foam | Transparency | Gloss 20° | Haze | Colour strength |
|---|---|---|---|---|---|---|
| 7 | 2 | little foam | 1 | 91 | 25 | 2 |
| 8 | 2 | little foam | 1 | 90 | 30 | 1-2 |
| 9 | 2 | little foam | 1 | 90 | 28 | 1-2 |
| 10 | 2 | little foam | 1 | 91 | 28 | 1-2 |
| 11 | 2 | little foam | 1 | 91 | 25 | 1-2 |
| 12 | 2 | little foam | 1-2 | 90 | 27 | 1-2 |
| Comparative Example 2 | 3 | slightly foamy | 2-3 | 56 | 305 | 3 |

The invention claimed is:
1. An addition compound suitable as a wetting and dispersing agent prepared by reacting
   A) one or more polyepoxides containing two or more epoxide groups with
   B) at least one aliphatic or araliphatic primary amine of the general formula I

$$H_2N-R \qquad (I)$$

wherein R is alkyl, cycloalkyl, aryl, or aralkyl, and wherein the at least one aliphatic or araliphatic primary amine of the general formula I optionally comprises —OH, tertiary amine, or carboxyl groups, to form an intermediate, which is subsequently reacted with C) at least one modified isocyanate of the general formula IIa or IIb

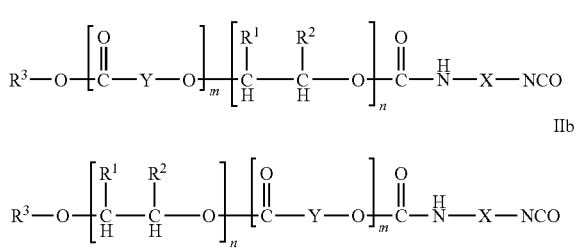

wherein
$R^3$ is alkyl, cycloalkyl, aryl, or aralkyl;
$R^1$ and $R^2$ are each independently H, alkyl, or aryl;
X is alkylene, cycloalkylene, or aralkylene;
Y is alkylene or cycloalkylene; and
n and m are independent of one another,
wherein the sum of n+m is greater than or equal to 2, to form a urethane.

2. The addition compound of claim 1, wherein the modified isocyanate of the general formula IIa or IIb is a polyalkyleneoxide modified isocyanate of the formula IIc

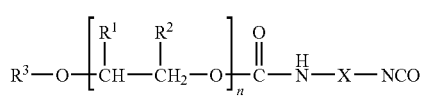

wherein $R^3$ is alkyl, cycloalkyl, aryl, or aralkyl;
$R^1$ is H, methyl, or ethyl;
X is alkylene, cycloalkylene, or aralkylene; and
n is 2 to 100.

3. The addition compound of claim 1, wherein at least one aliphatic or araliphatic primary amine of the general formula III is used

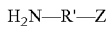  III wherein R' is alkylene and Z is a heterocyclic radical.

4. The addition compound of claim 1, wherein the one or more polyepoxides are diepoxides of the general formula IV

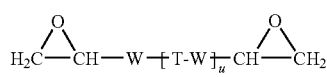  IV wherein
W=—CH$_2$—O— or —CH$_2$—;
T=alkyl, cycloalkyl, aryl, or aralkyl; and
u=1-8.

5. The addition compound of claim 4, wherein the diepoxides are aromatic-containing diepoxide compounds having on average two epoxy groups per molecule.

6. The addition compound of claim 5, wherein the diepoxide compounds are diglycidyl ethers of difunctional phenol derivatives.

7. The addition compound of claim 4, wherein the diepoxides are aliphatic or cycloaliphatic diepoxide compounds having on average two epoxy groups per molecule.

8. The addition compound of claim 1, further comprising reacting any terminal amino groups present in the urethane with isocyanates, lactones, cyclic carbonates, or acrylates.

9. The addition compound of claim 1, further comprising reacting any terminal epoxide groups present in the urethane with secondary amines or acids.

10. The addition compound of claim 1, further comprising reacting any hydroxyl groups present in the urethane with hydroxycarboxylic acids or cyclic lactones.

11. The addition compound of claim 1, further comprising reacting any remaining hydroxyl groups present in the urethane with isocyanates other than the at least one isocyanate of the general formula IIa or IIb.

12. The addition compound of claim 1, further comprising reacting any remaining hydroxyl groups present in the urethane with phosphoric acid, polyphosphoric acid, acidic phosphoric esters, or carboxylic acids.

13. The addition compound of claim 1, further comprising performing an alkylation or an oxidation on the amino groups present in the urethane to form quaternary ammonium salts or nitrogen oxides.

14. A process for preparing an addition compound suitable as a wetting and dispersing agent comprising reacting
A) one or more polyepoxides containing two or more epoxide groups with
B) at least one aliphatic or araliphatic primary amine of the general formula I

  I wherein R is alkyl, cycloalkyl, aryl, or aralkyl, and wherein the primary amine optionally comprises —OH, tertiary amine, or carboxyl groups, to form an intermediate, which is subsequently reacted with
C) at least one modified isocyanate of the general formula IIa or IIb

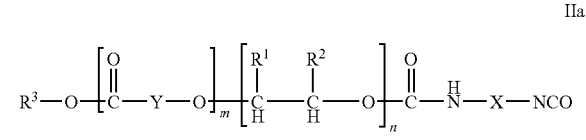

wherein
$R^3$ is alkyl, cycloalkyl, aryl, or aralkyl;
$R^1$ and $R^2$ are each independently H, alkyl, or aryl;
X is alkylene, cycloalkylene, or aralkylene;
Y is alkylene or cycloalkylene; and
n and m are independent of one another,
wherein the sum of n+m is greater than or equal to 2, to form a urethane.

15. The process of claim 14, wherein the modified isocyanate of the general formula IIa or IIb is a polyalkyleneoxide modified isocyanate of the formula IIc

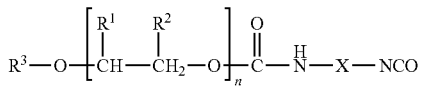 IIc wherein R³ is alkyl, cycloalkyl, aryl, or aralkyl;
R¹ is H, methyl, or ethyl;
X is alkylene, cycloalkylene, or aralkylene; and
n is 2 to 100.

16. The process of claim 14, wherein at least one aliphatic or araliphatic primary amine of the general formula III is used

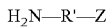 III wherein R' is alkylene and Z is a heterocyclic radical.

17. The process of claim 14, wherein the one or more polyepoxides containing two or more epoxide groups are diepoxides of the general formula IV

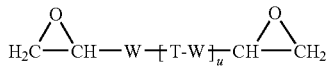 IV wherein
W=—$CH_2$—O— or —$CH_2$—;
T=alkyl, cycloalkyl, aryl, or aralkyl; and
u=1-8.

18. The process of claim 14, wherein the one or more polyepoxides containing two or more epoxide groups and the at least one aliphatic or araliphatic primary amine of the general formula I are used in a molar ratio of 2:3 to 3:2.

19. The process of claim 14, wherein the one or more polyepoxides containing two or more epoxide groups, the at least one aliphatic or araliphatic primary amine of the general formula I, and the at least another aliphatic or araliphatic primary amine of the general formula III are used in a molar ratio of 2:3 to 3:2.

20. The process of claim 14, wherein the at least one modified isocyanate of the general formula IIa or IIb is used in an amount such that 5-100% of the OH groups of the intermediate generated by the addition reaction of the one or more polyepoxides containing two or more epoxide groups and the at least one aliphatic or araliphatic primary amine of the general formula I, are subsequently reacted to form the urethane.

21. The process of claim 14, wherein the at least one modified isocyanate of the general formula IIa or IIb is used in an amount such that 5-100% of the OH groups of the intermediate generated by the addition reaction of the polyepoxide containing two or more epoxides, the at least one aliphatic or araliphatic primary amine of the general formula I, and the at least another aliphatic or araliphatic primary amine of the general formula III, are subsequently reacted to form the urethane.

22. Solids in powder or fibre form, which have been coated with addition compound of claim 1.

* * * * *

UNITED STATES PATENT AND TRADEMARK OFFICE
CERTIFICATE OF CORRECTION

PATENT NO. : 8,653,222 B2  Page 1 of 1
APPLICATION NO. : 12/224523
DATED : February 18, 2014
INVENTOR(S) : Orth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this

Twenty-ninth Day of September, 2015

Michelle K. Lee
*Director of the United States Patent and Trademark Office*